United States Patent
Chen (10) Patent No.: US 6,337,620 B1
(45) Date of Patent: Jan. 8, 2002

(54) CIPHER TYPE ANTI-THEFT SYSTEM FOR CARS USING IN-CAR WIRING TO TRANSMIT THE CIPHER

(75) Inventor: Tse-Hsing Chen, Taipei Shien (TW)

(73) Assignee: Shu-Chen Lu, Taipei Shien (TW)

( * ) Notice: Subject to any disclaimer, the term of this patent is extended or adjusted under 35 U.S.C. 154(b) by 0 days.

(21) Appl. No.: 09/396,889

(22) Filed: Sep. 16, 1999

(51) Int. Cl.[7] .............................................. H04M 11/04
(52) U.S. Cl. .................. 340/310.01; 180/287; 307/10.5
(58) Field of Search ........................... 340/310.01, 426, 340/825.69; 180/287; 307/10.5

(56) References Cited

U.S. PATENT DOCUMENTS

| | | | | |
|---|---|---|---|---|
| 4,932,494 A | * | 6/1990 | Chandler ..................... | 180/287 |
| 5,449,957 A | * | 9/1995 | Carlo ........................... | 180/287 |
| 5,528,086 A | * | 6/1996 | Maass et al. ........... | 340/310.01 |
| 5,552,642 A | * | 9/1996 | Dougherty et al. ......... | 180/287 |
| 5,644,172 A | * | 7/1997 | Hodges ................ | 340/310.01 |
| 5,677,663 A | * | 10/1997 | Sansome .................... | 307/10.5 |
| 6,018,291 A | * | 1/2000 | Marble et al. .............. | 180/287 |

* cited by examiner

Primary Examiner—John A. Tweel
(74) Attorney, Agent, or Firm—Dougherty & Troxell (57) ABSTRACT

A cipher type anti-theft system for cars using an in-car wiring to transmit a cipher mainly includes an encoder/transmitter and at least one decoder cut-off relay. The encoder/transmitter generates a cipher and converts the cipher from digits to analog signals for loading onto the in-car wiring. The at least one decoder cut-off relay may be installed at any point on any power supply circuit needed to start the car. When the at least one decoder cut-off relay receives a correct cipher, it can decode the cipher and make the power supply circuit to allow start of the car. The encoder/transmitter and the decoder cut-off relay can be installed in the car without producing additional (or direct) wiring and are therefore not easily found from outside. The encoder/transmitter may be an independent and portable unit associated with certain in-car equipment, such as a cigarette lighter, and uses the cigarette lighter holder, for example, as an interface to receive and transmit the cipher.

4 Claims, 7 Drawing Sheets

CIPHER TYPE ANTI-THEFT SYSTEM FOR CARS USING IN-CAR WIRING TO TRANSMIT THE CIPHER

BACKGROUND OF THE INVENTION

The present invention relates to an anti-theft system for cars, and more particularly, to a cipher type anti-theft system that uses in-car wiring to transmit a cipher for arming and disarming the car. Any general consumer can easily install the anti-theft system in a car without the help of a skilled worker or the need to build any additional wiring. No additional wiring would exist in the car to form any trace for a theft.

Figure 1:
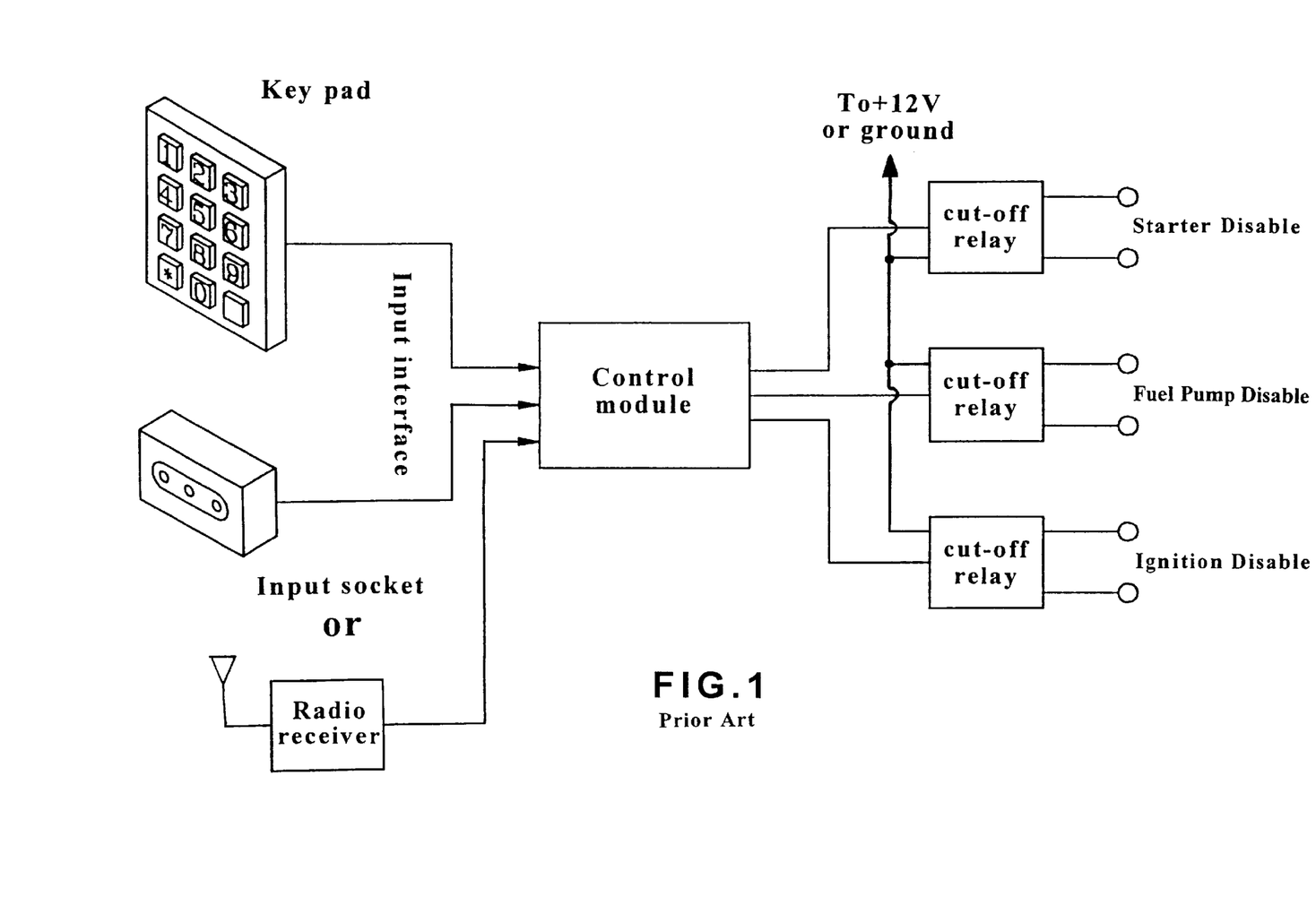
FIG. 1 is a schematic diagram showing the structure of a conventional cipher type anti-theft system.

To prevent a car from being stolen, a common practice is to install an anti-theft system in the car. Generally, when a car is touched, a moved or intruded without authorization, the anti-theft system installed in the car would emit sound or give an alarm and cut off one of more major circuits needed to start the card, so as to stop the thief from driving the car away. There are also deluxe cars installed with anti-theft system that requires input of a correct cipher to disarm the car from the anti-theft system. FIG. 1 shows a basic design for such cipher type anti-theft systems currently available in the market. As shown, the conventional cipher-type anti-theft system includes a control module that is connected to at least one cut-off relay via wires, and the at least one cut-off relay is connected to the starter, fuel pump or igniter of the car. A cipher is input via an external interface, such as a keypad, an input socket or a radio receiver and sent to the control module via a wire. The control module controls the at least one cut-off relay through wires, so that at least one cut-off relay is cut off to disable the starter, igniter or fuel pump of the car and therefore protects the car from being driven away by a thief.

The following are some of the disadvantages of the above-described conventional cipher type anti-theft systems:

1. All the currently available cipher type anti-theft systems have a control module that requires additional wiring for installing it on a car. The installation is complicated and time-consuming and must be done by a skilled worker. The conventional cipher type anti-theft systems therefore require high installation cost.
2. In consideration of the power supply to the control module and the control of different parts by the control module, it is a common practice to locate the control module below the instrument panel or a front seat close to the external keypad or input socket for inputting a cipher. A thief entering the car may easily find the external keypad or input socket and then trace the wire or status LED to the control module to locate and destroy it. When this happens, the cut-off relay would automatically close the circuit within a short time and therefore lose its anti-theft function.
3. To enhance the function of the cipher type anti-theft system, there is developed a special externally cut-off relay. However, to simplify and shorten wiring between the control module and the external relay, the external relay is usually installed at a position close to the control module or the ignition switch of the car. The relay mounted at such positions can be very easily located and removed or disabled by causing it to short-circuit. For an experienced theft, the conventional cipher type anti-theft system is almost useless.

In brief, all the currently available cipher type anti-theft systems that require additional wiring just could not guard the car against the theft at all. There are cars installed with such conventional cipher type anti-theft system being intruded and driven away within a very short time, because the theft can easily intrude the car and quickly open the hood to cut off the alarm siren before return to the car to quickly locate and destroy the control module and all the cut-off relays of the anti-theft system by tracing any additional wiring in the car.

It is therefore tried by the inventor to develop an improved cipher type anti-theft system for cars that eliminates the drawbacks existing in the convention cipher type anti-theft systems.

SUMMARY OF THE INVENTION

A primary object of the present invention is to provide a cipher type anti-theft system for cars that can be easily installed in the car by any general consumer without the need of any additional wiring. A specific cipher can be transmitted through in-car wiring and there is no way for a theft to find out the anti-theft system by tracing the additional anti-theft wires in the car.

Another object of the present invention is to provide a cipher type anti-theft system for cars, an embodiment of which uses a cigarette lighter holder in the car as an interface to input and transmit a specific cipher.

To achieve the above and other objects, the present invention mainly includes an encoder/transmitter and at least one decoder cut-off relay. The encoder/transmitter may generate a cipher and convert the same from digits to analog signals for loading onto in-car wiring. The at least one decoder cut-off relay may be installed at any point on any power supply circuit needed to start the car in a normal manner. When the at least one decoder cut-off relay receives a correct cipher, it would decode the cipher and make the circuit to enable starting of the car. No additional wiring is needed in installing the encoder/transmitter and the at least one decoder cut-off relay. The cipher type anti-theft system of the present invention can therefore be installed in a simpler and more convenient manner and would not be easily located by a theft by tracing any additional wiring in the car. Moreover, the encoder/transmitter of the anti-theft system of the present invention may be designed to be an independent and portable unit associated with a cigarette lighter, so that the cigarette lighter holder in the car may be used as an interface to receive the cipher without being easily located by the theft. Such cipher type anti-theft system may therefore effectively hamper the theft from driving the car away within a short time.

BRIEF DESCRIPTION OF THE DRAWINGS

The structure and the operation of the present invention may be best understood by referring to the following detailed description of preferred embodiments and the accompanying drawings, wherein.

DETAILED DESCRIPTION OF THE PREFERRED EMBODIMENTS

Figure 2:
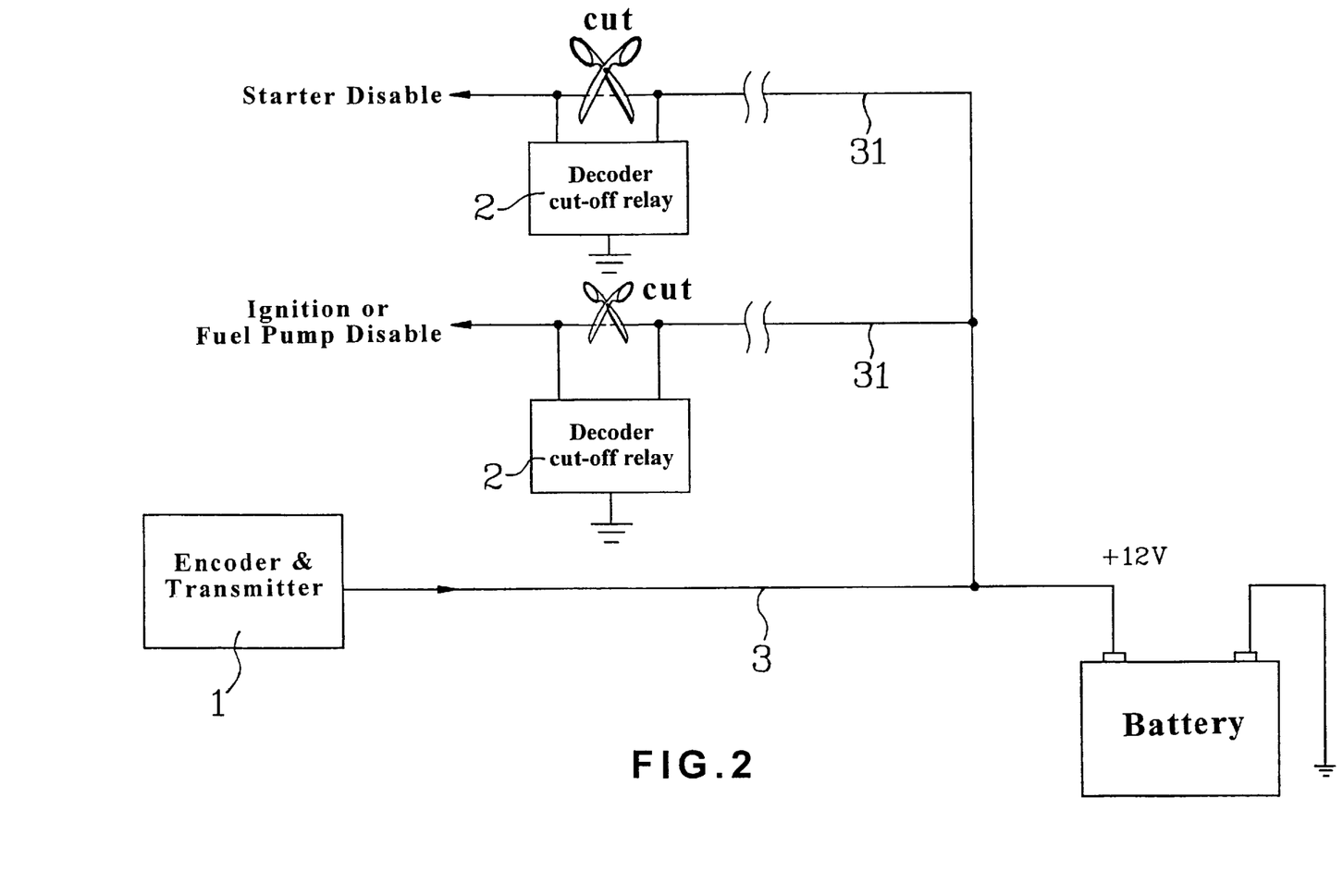
FIG. 2 is a schematic diagram showing the structure of a cipher type anti-theft system according to the present invention.

Please refer to FIG. 2 that is a schematic diagram of a cipher type anti-theft system for cars according to the present invention. The cipher type anti-theft system mainly includes an encoder/transmitter 1 and at least one decoder cut-off relay 2. The encoder/transmitter 1 generates a cipher and converts the cipher from digits into analog signals for loading onto an in-car wiring 3. The at least one decoder cut-off relay 2 may be connected to any one point on a power supply circuit 31 needed to start the car in a normal way. When a correct cipher is received, the at least one encoder cut-off relay 2 can decode the cipher and make the power supply circuit for starting the car. Therefore, when installing the anti-theft system of the present invention, no other additional wiring is needed between the encoder/transmitter 1 and the at least one decoder cut-off relay 2. That is, signals representing the cipher set for the car can be transmitted via the original in-car wiring 3 and therefore enables simplified installation of the anti-theft system. A general consumer may easily install the anti-theft system of the present invention without the help of a skilled worker. After the anti-theft system of the present invention is installed, no additional wiring is present in the car. Therefore, there is no way for a theft to locate the anti-theft system by tracing any additional wiring that leads to the anti-theft system.

Figure 3:
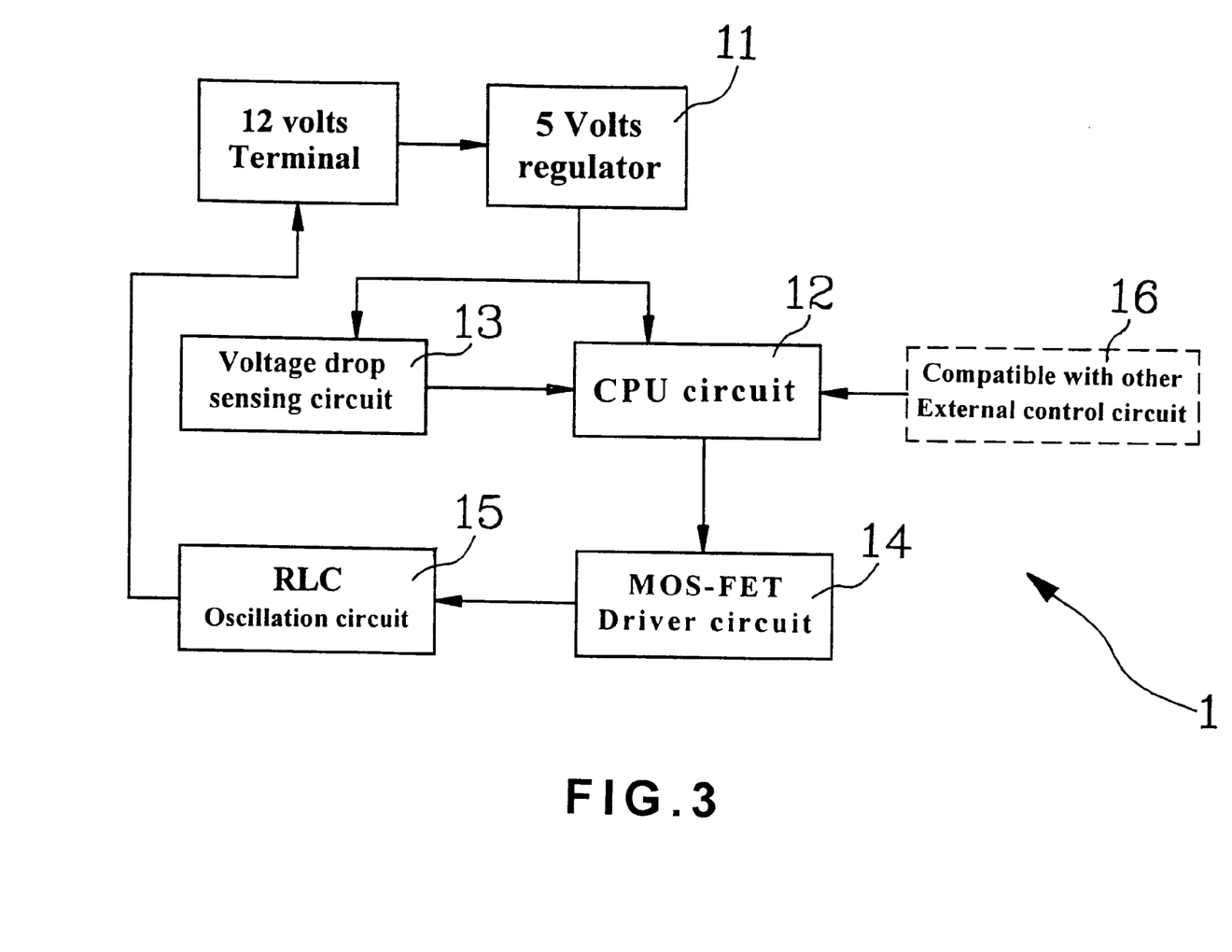
FIG. 3 is a block diagram of the encoder/transmitter included in the anti-theft system of the present invention.
Figure 4:
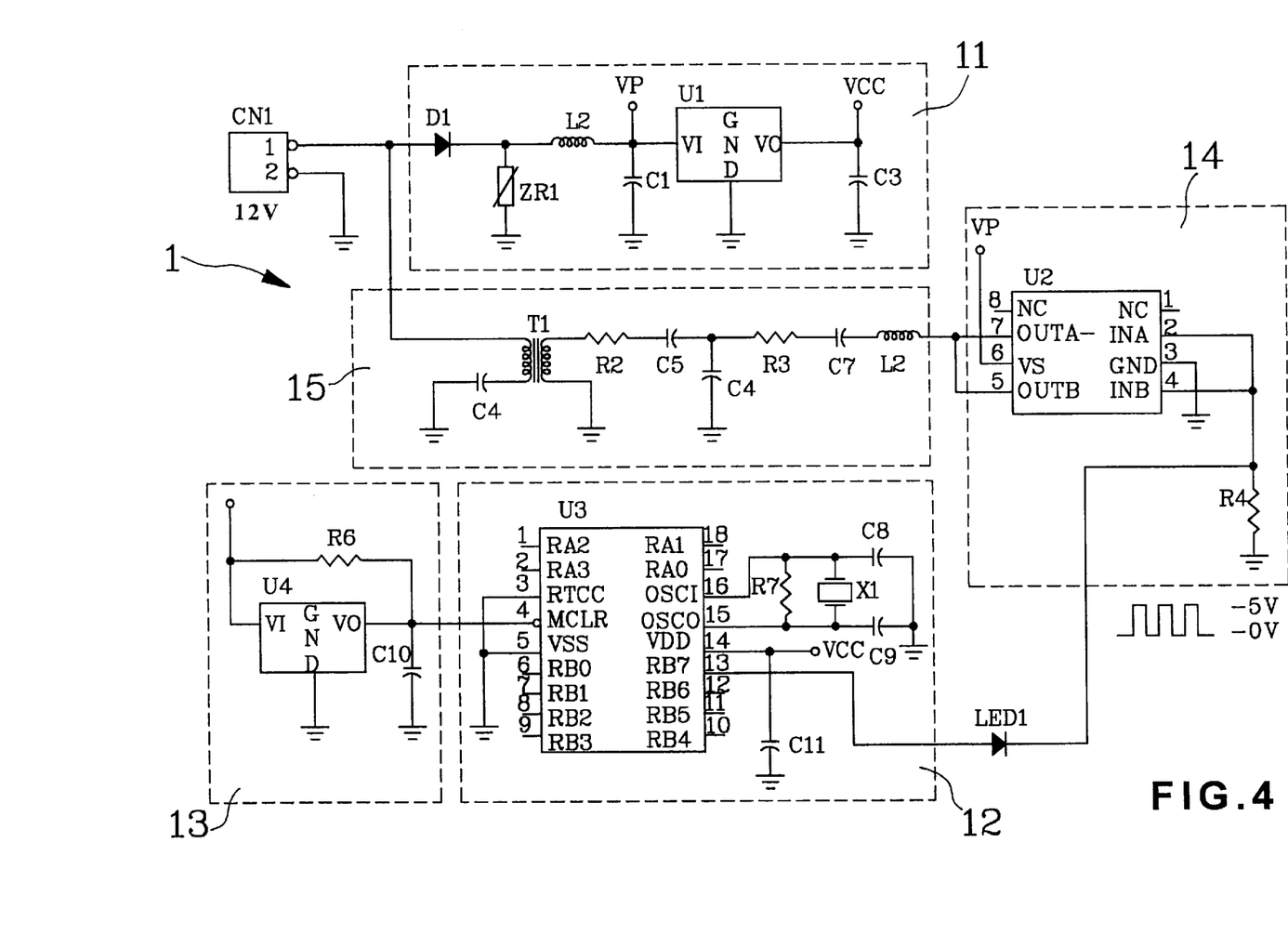
FIG. 4 is a circuit diagram of the encoder/transmitter included in the anti-theft system of the present invention.

Please refer to FIGS. 3 and 4. In an embodiment of the present invention, the encoder/transmitter 1 includes a 5V regulator 11 that converts a 12V power source for the in-car wiring 3 into a stabilized 5V voltage for use by the encoder/transmitter 1; a CPU circuit 12 that generates particular square-wave signals to represent a specific cipher; a voltage drop sensing circuit 13 that detects the 5V voltage for its stabilization in order to provide a RESET signal to the CPU circuit 12 to restart a CPU in the CPU circuit 12; a MOS-FET driver circuit 14 that amplifies current and voltage of the signals representing the cipher; and a RLC oscillation circuit 15 that modulates the signals to high frequency and the modulated high-frequency signals are coupled via a transformer T1 to a 12V power cord included in the in-car wiring 3.

Figure 5:
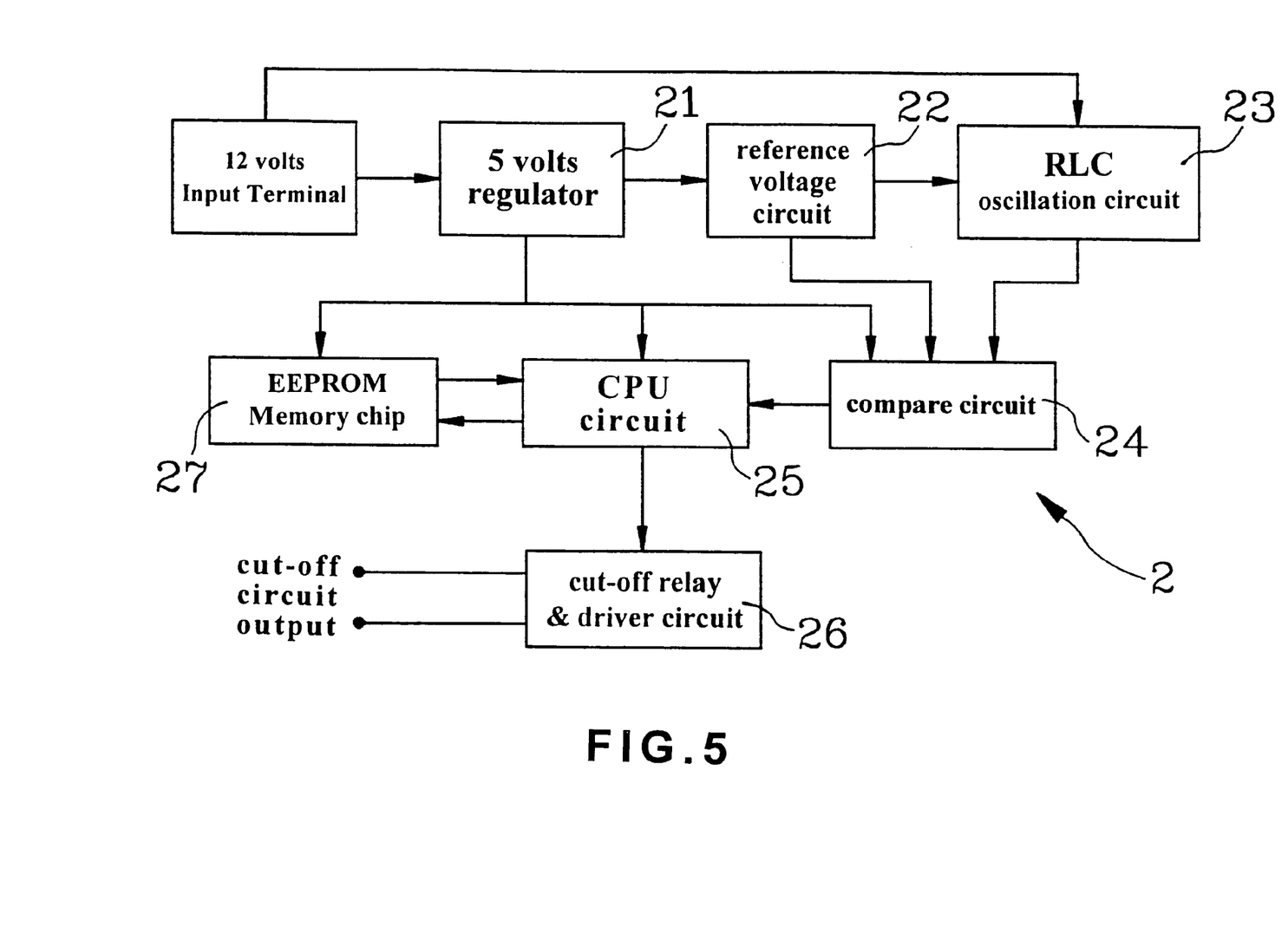
FIG. 5 is a block diagram of the decoder cut-off relay included in the anti-theft system of the present invention.
Figure 6:
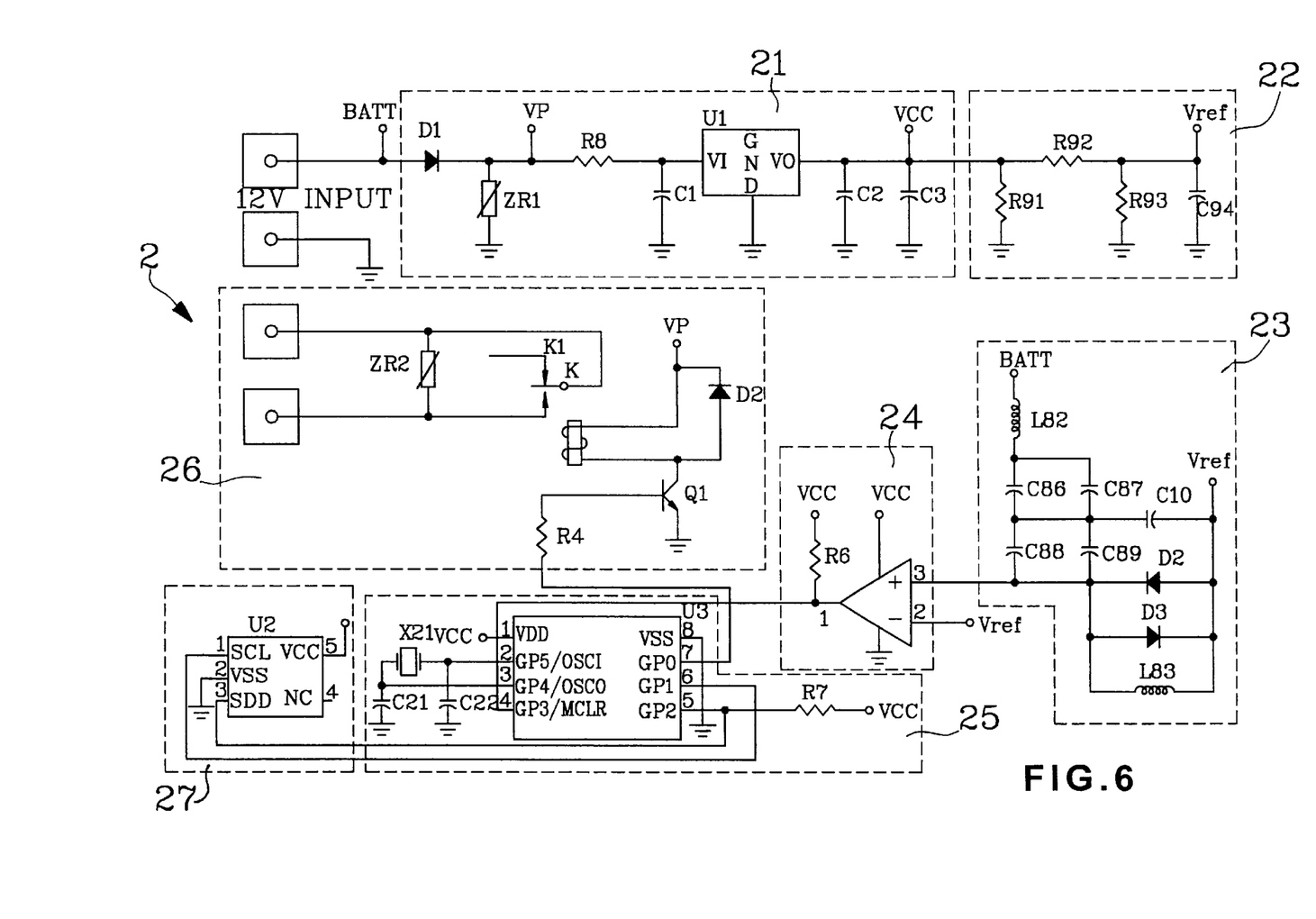
FIG. 6 is a circuit diagram of the decoder cut-off relay included in the anti-theft system of the present invention.

As shown in FIGS. 5 and 6, the decoder cut-off relay 2 each includes a 5V regulator 21 that converts the 12V power source for the in-car wiring 3 into a stabilized 5V voltage for use by the decoder cut-off relay 2; a reference voltage circuit 22 that generates a reference voltage of 2.5V for using by a compare circuit 24 as a reference in comparison; a RLC oscillation circuit 23 that extracts high-frequency signals from the 12V power supply and the extracted high-frequency signals are filtered, shaped and amplified for extraction of signals having particular frequency; a compare circuit 24 that shapes and amplifies the filtered signals into square-wave signals; a CPU circuit 25 that reads in the square-wave signals and determines whether the signals represent a correct cipher, so that instructions may be given to the at least one cut-off relay 26 and any driver circuit thereof to either make or break the power supply circuit; and an EEPROM 27 that memorizes the specific cipher set for the car and stores data needed by the CPU to make any determination.

With the above-described design, no additional (or direct) wiring is needed when installing the encoder/transmitter 1 and the at least one decoder cut-off relay 2. Taking the wiring of FIG. 1 as an example, a user may select based on his own judgement any concealed point on any one power supply circuit 31 needed to enable an igniter, a starter or a fuel pump of the car, and install the decoder cut-off relay 2 to the selected point. A theft could not easily find and destroy the decoder cut-off relay 2 no sooner than he has intruded the car.

Please refer to FIG. 4 again. When the encoder and transmitter 1 is actuated in a normal procedure, a central processing unit (CPU) U3 in the CPU circuit 12 will generate a square-wave cipher having specific frequencies, for example, using a square-wave of 55 KHz to represent 1 and a square-wave of 58 KHz to represent 0 (any signals of other different frequencies may, of course, substitute the frequencies in the above example). The CPU circuit 12 includes CPU oscillation circuits X1, R7, C8, and C9, and a filter capacitor C11. A light-emitting diode LED1 is provided to show whether the signals representing the specific cipher are transmitted. The reason for using different frequencies to represent 0 and 1 is to facilitate modulation of the signals and load the modulated signals onto the in-car wiring 3. By this way, nose interference from engine and the like may be prevented. The generated square-wave signals are sent to the driver circuit U2 (14) at where the square-wave of 5V is amplified to 12V, so that there is sufficient current for driving the secondary oscillation circuit 15. The oscillation circuit 15 includes L2, C7, C5 and C6, and R3 and R2 are an impedance match. A digital to analog conversion is conducted at L2 to covert the signals sent to the oscillation circuit 15 into a sine wave of 12V. The signals are further amplified at R2 to a sine wave about 45V, so that the signals have sufficient electric energy to pass a primary coil of the transformer T1 and be coupled to a secondary coil thereof, permitting the signals representing the specific cipher in the form of sine wave to be loaded onto a +12V wire of the in-car wiring 3. At this point, the CPU needs only a very short transmission time to let the signals representing the specific cipher exist in all 12V wires in the car. Therefore, no matter at what a distant position in the in-car wiring 3 the decoder cut-off relay 2 is mounted, it could receive the signals via a 12V wire of the in-car writing 3.

Please refer to FIG. 6 again. When the decoder cut-off relay 2 receives a signal, the signals are coupled via a transformer T2 to the oscillation circuit 23 consisting of L82, C86/C87, C88/C89, C10, and L83, so that signals in the form of sine-wave may be extracted. During transmission, loss of signals exists more or less. Sometimes, the signals are only 0.1V when they reach the at least one decoder cut-off relay 2. However, when the signals pass the oscillation circuit 23, the 12V is filtered and the sine-wave signals having the required frequencies are amplified to about 2V. The amplified 2V signals are sent to the compare circuit 23 that is a secondary circuit where the 2V sine-wave signals are compared with a reference voltage generated by the reference voltage circuit 22 consisting of R91, and C94 and then be converted to 5V square-wave signals. The 5V square-wave signals are then sent to a secondary CPU circuit 25 for determination. In the CPU circuit 25, X21, C21 and C22 together form an oscillating circuit. U22 is the EEPROM 27 for memorizing the cipher set for the car and storing data needed by the CPU to make any determination. When the CPU determines the extracted signals represent a correct cipher, the cut-off relay 26 and any driver circuit thereof are instructed to make the power supply circuit to allow normal start of the car. On the contrary, when the extracted signals are determined to represent an incorrect cipher, the cut-off relay 26 and any driver circuit thereof are instructed to disable the power supply circuit and the car can not be started.

In practical use, the encoder/transmitter 1 may be an independent and portable unit. In this case, an anti-theft status of the car can be cleared only when the encoder/transmitter 1 is brought to contact with the in-car wiring 3. Alternatively, a compatible external control circuit 16 may be used to actuate the anti-theft system. For example, a remote controller may be used to remotely actuate the encoder/transmitter 1. Or, the circuit of the encoder and transmitter 1 of the present invention may be incorporated in the currently available remote controllers or in chips of the control module of a conventional anti-theft system. By this way, the anti-theft system of the present invention can have the functions of conventional anti-theft systems and is more useful in protecting the car from theft due to its hidden position in the in-car wiring 3. With these arrangements, even the control module of the anti-theft system is disconnected from the in-car wiring 3, the at least one decoder cut-off relay 2 is still in an open state to disable the starter, fuel pump or igniter of the car and prevents the theft from starting the car.

For some other users who are not willing to cut the in-car wiring 3 for connecting the anti-theft system thereto, the decoder cut-off relay 2 of the present invention may also be provided in the form of a plug similar to the fuel pump, starter, and ignition relays originally designed for the car. The user needs only to dismount the relays provided along with the car and replace the same with the particularly designed decoder cut-off relay 2 of the present invention to have the anti-theft system well hidden in the in-car wiring 3 and provide good anti-theft effect.

Figure 7:
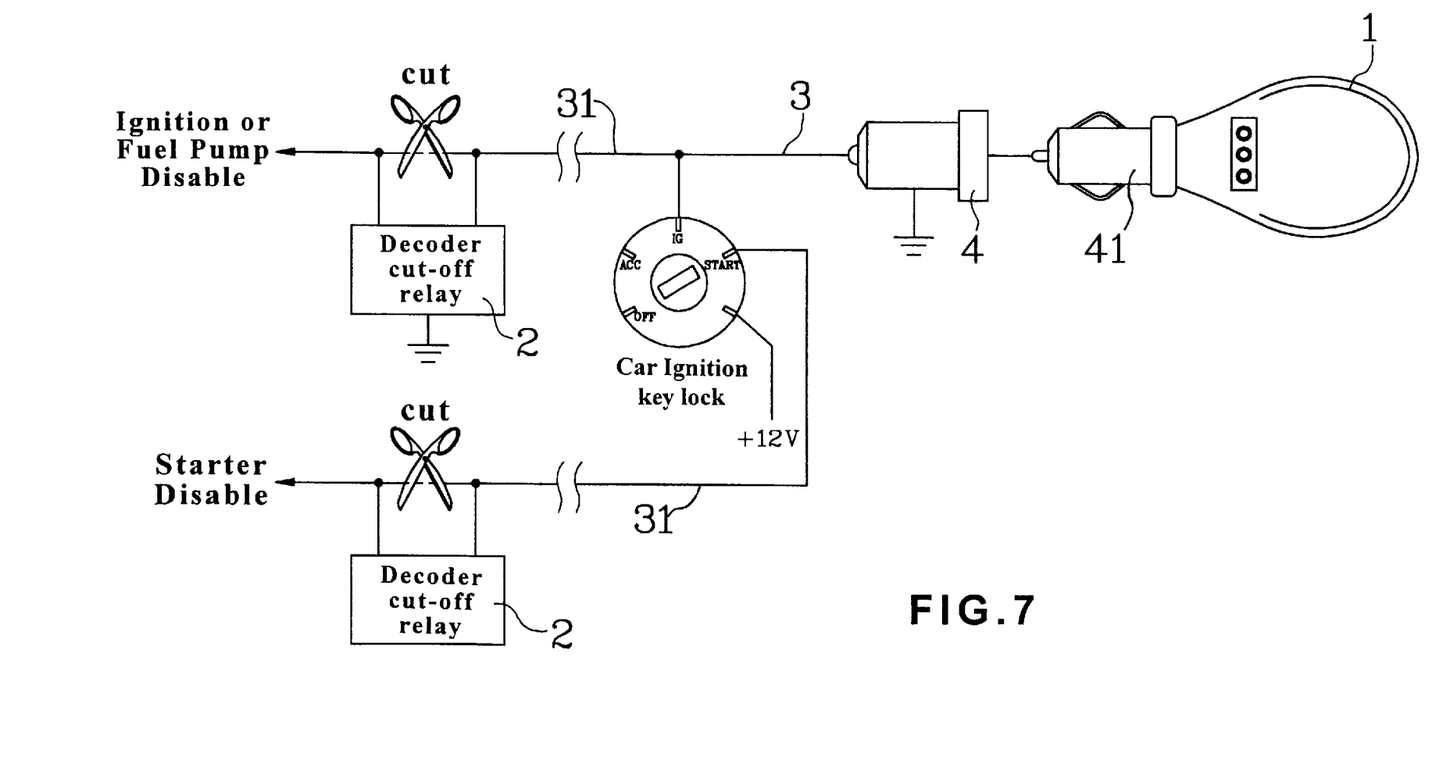
FIG. 7 illustrates an embodiment of the present invention in which a cipher is transferred via the cigarette lighter holder in a car.

FIG. 7 illustrates a preferred embodiment of the present invention that is incorporated in equipment originally provided in the car. In this embodiment, the cipher type anti-theft system includes an encoder/transmitter 1 that is associated with a cigarette lighter 41 and is an independent and portable unit for generating a cipher. After a digital to analog conversion, the cipher is transmitted via a cigarette lighter holder 4 on the car to the in-car wiring 3. The anti-theft system of this preferred embodiment also includes at least one decoder cut-off relay 2 that can be installed at any point on any power supply circuit 31 needed to start the car in a normal way. When the decoder cut-off relay 2 receives signals representing the correct cipher, it may decode the cipher and make the power supply circuit 31 for normal start of the car. To start the car installed with the cipher type anti-theft system according to the embodiment of FIG. 7, a user needs only to plug the cigarette lighter 41 associated with the portable encoder/transmitter 1 into the cigarette lighter holder 4 in the car. At this point, the cipher is loaded onto the +12V wire in the car through the 12V power supply of the cigarette lighter holder 4. The decoder cut-off relay 2 mounted at a distant point on the in-car wiring 3 may receive the cipher from the 12V wire to determine whether the power supply circuit 31 should be made to allow start of the car. The cigarette lighter holder 4 is an item that is provided in every car. When the cigarette lighter holder 4 is used to transmit an anti-theft cipher without changing or increasing any wiring thereof, it just looks like any other normal cigarette lighter holder. In the event the car is intruded by a theft, it would not be easy for the theft to find, at least not within a short time, the cigarette lighter holder is actually a part of the anti-theft system.

The present invention has novel and simplified structure compared to the conventional anti-theft systems. Moreover, the present invention is directly connected to the in-car wiring and the installation thereof is easy to save a lot of time and labor. What is most important is the present invention does not produce any additional (or direct) wiring that can be traced by the theft to locate the cut-off relay anti-theft system. What is to be noted is the form of the present invention shown and disclosed is to be taken as a preferred embodiment of the invention and that various changes in the shape, size, and arrangements of parts may be resorted to without departing from the spirit of the invention or the scope of the subjoined claims.

What is claimed is:

1. A cipher type anti-theft system for cars using an in-car wiring to transmit a cipher comprising:

an encoder/transmitter for generating a cipher and converting said cipher from digits into analog signals for loading onto said in-car wiring; and at least one decoder cut-off relay that can be installed at any point on any power supply circuit needed to start a car in a normal way, and said decoder cut-off relay, when receiving signals sent by said encoder and transmitter and representing a correct cipher, being capable of decoding said cipher and making said power supply circuit onto which said decoder cut-off relay is installed;

whereby said cipher type anti-theft system can be conveniently installed in the car at a hidden position on the in-car wiring without producing any additional wiring that would otherwise form a trace for a thief to easily locate said anti-theft system wherein said encoder/transmitter comprises a 5V regulator that converts a 12V power source of said in-car wiring into a stabilized 5V voltage for use by said encoder/transmitter, a CPU circuit that generates a particular, square-wave cipher signal, a voltage drop sensing circuit that detects said 5V voltage for its stabilization in order to provide a RESET signal to said CPU circuit to restart a CPU included in a said CPU circuit, a MOS-FET driver circuit that amplifiers current and voltage of said signals sent by said encoder/transmitter, and a RLC oscillation circuit that modulates said received signals to high-frequency signals and said modulated high-frequency signals being coupled via a transformer to a 12V power cord included in said in-car wiring; and wherein said at least one decoder cut-off relay comprises a 5V regulator that converts said 12V power source of said in-car wiring into a stabilized 5V voltage for use by said at least one decoder cut-off relay, a reference voltage circuit that generates a reference voltage of 2.5V for using by a compare circuit as a reference in comparison, a RLC oscillation circuit that extracts said high-frequency signals from said 12V power supply and said extracted high-frequency signals being filtered, shaped and amplified for extraction of signals of particular frequencies, a compare circuit that shapes and amplifies said filtered signals into square-wave signals, a CPU circuit that reads in said square-wave signals and determines whether said signals representing a correct cipher in order to instruct said at least decoder cut-off relay to either make or break said power supply circuit to which said decoder cut-off relay is connected, and an EEPROM that memorizes said cipher set for the car and stores data needed by said CPU to determine whether said received signals representing a correct cipher.

2. A cipher type anti-theft system for cars using an in-car wiring to transmit a cipher as claimed in claim 1, wherein said cipher is transmitted at two different frequencies separately representing 0 and 1.

3. A cipher type anti-theft system for cars using an in-car wiring to transmit a cipher as claimed in claim 1, wherein said encoder and transmitter has an external control circuit for encoder/transmitter to be actuated by a remote signal.

4. A cipher type anti-theft system for cars using an in-car wiring to transmit a cipher as claimed in claim 1, wherein said at least one decoder cut-off relay is in a form of plug similar to a fuel pump, a starter or an ignition relay for the car.

* * * * *